(12) United States Patent
May et al.

(10) Patent No.: US 7,596,127 B1
(45) Date of Patent: Sep. 29, 2009

(54) SYSTEM FOR ALLOCATING DATA IN A COMMUNICATIONS SYSTEM AND METHOD THEREOF

(75) Inventors: Michael R. May, Austin, TX (US); Michael D. Cave, Austin, TX (US)

(73) Assignee: Vixs Systems, Inc., Toronto, Ontario (CA)

( * ) Notice: Subject to any disclaimer, the term of this patent is extended or adjusted under 35 U.S.C. 154(b) by 1039 days.

(21) Appl. No.: 09/999,593

(22) Filed: Oct. 31, 2001

(51) Int. Cl.
*H04J 1/00* (2006.01)

(52) U.S. Cl. .................. 370/343; 370/329; 370/468

(58) Field of Classification Search ............. 370/329, 370/330, 343, 344, 468, 260; 375/260
See application file for complete search history.

(56) References Cited

U.S. PATENT DOCUMENTS

| | | | |
|---|---|---|---|
| 3,781,873 A * | 12/1973 | Nussbaumer | 341/56 |
| 4,866,395 A | 9/1989 | Hosteller | |
| 5,027,203 A | 6/1991 | Samad et al. | |
| 5,093,847 A | 3/1992 | Cheng | |
| 5,115,812 A | 5/1992 | Sano et al. | |
| 5,222,247 A * | 6/1993 | Breeden | 455/26.1 |
| 5,253,056 A | 10/1993 | Puri | |
| 5,475,434 A | 12/1995 | Kim | |
| 5,563,950 A | 10/1996 | Easter et al. | |
| 5,602,589 A | 2/1997 | Vishwanath et al. | |
| 5,635,985 A | 6/1997 | Boyce et al. | |
| 5,644,361 A | 7/1997 | Ran et al. | |
| 5,652,749 A | 7/1997 | Davenport et al. | |
| 5,732,391 A | 3/1998 | Fiocca | |
| 5,737,020 A | 4/1998 | Hall et al. | |
| 5,740,028 A | 4/1998 | Sugiyama et al. | |
| 5,760,740 A * | 6/1998 | Blodgett | 342/362 |

(Continued)

FOREIGN PATENT DOCUMENTS

EP    0661826 A2    7/1995

(Continued)

OTHER PUBLICATIONS

Pedro Assuncao and Mohammad Ghanbari, "Rate Reduction Techniques for MPEG-2 Video Bit Streams," SPIE vol. 2952, Apr. 1996, 10 pp.

(Continued)

*Primary Examiner*—Kwang B Yao
*Assistant Examiner*—Nguyen Ngo

(57) ABSTRACT

Poor transmission reliability is identified in a data channel. Multiple frequency carriers are used to transmit different sets of data within the data channel. A frequency bin is assigned to each frequency carrier. The frequency bins are used to provide data to each frequency carrier. A transmission power assigned to each frequency carrier may be insufficient to overcome noise in the data channel when all the frequency bins are used to transfer data concurrently. The number of frequency bins associated with frequency carriers of the data channel are reduced. Power is increased to the available frequency bins to improve transmission reliability. The available frequency bins are allocated across the data channel according to a pattern used to spread allocated transmission power across the data channel. The frequency bin pattern is rotated among available frequency bins of the data channel, allowing different frequency bins to be used for each transmission. Accordingly, a power spectral density associated with the transmissions remains within a nominal power spectral density.

11 Claims, 7 Drawing Sheets

U.S. PATENT DOCUMENTS

| | | | |
|---|---|---|---|
| 5,844,545 | A | 12/1998 | Suzuki et al. |
| 5,850,443 | A | 12/1998 | Van Oorschot et al. |
| 5,940,130 | A | 8/1999 | Nilsson et al. |
| 5,996,029 | A | 11/1999 | Sugiyama et al. |
| 6,005,623 | A | 12/1999 | Takahashi et al. |
| 6,005,624 | A | 12/1999 | Vainsencher |
| 6,014,694 | A | 1/2000 | Aharoni et al. |
| 6,040,863 | A | 3/2000 | Kato |
| 6,044,268 | A * | 3/2000 | Haartsen ............ 370/294 |
| 6,081,295 | A | 6/2000 | Adolph et al. |
| 6,085,094 | A * | 7/2000 | Vasudevan et al. ...... 455/447 |
| 6,101,172 | A * | 8/2000 | van Bavel et al. ...... 370/295 |
| 6,141,693 | A | 10/2000 | Perlman et al. |
| 6,144,402 | A | 11/2000 | Norsworthy et al. |
| 6,167,084 | A | 12/2000 | Wang et al. |
| 6,182,203 | B1 | 1/2001 | Simar, Jr. et al. |
| 6,215,821 | B1 | 4/2001 | Chen |
| 6,219,358 | B1 | 4/2001 | Pinder et al. |
| 6,222,886 | B1 | 4/2001 | Yogeshwar |
| 6,226,306 | B1 * | 5/2001 | Yajima et al. ........... 370/538 |
| 6,236,683 | B1 | 5/2001 | Mougeat et al. |
| 6,259,741 | B1 | 7/2001 | Chen et al. |
| 6,263,022 | B1 | 7/2001 | Chen et al. |
| 6,300,973 | B1 | 10/2001 | Feder et al. |
| 6,307,939 | B1 | 10/2001 | Vigarie |
| 6,314,138 | B1 | 11/2001 | Lemaguet |
| 6,323,904 | B1 | 11/2001 | Knee |
| 6,366,614 | B1 | 4/2002 | Pian et al. |
| 6,385,248 | B1 | 5/2002 | Pearlstein et al. |
| 6,396,872 | B1 * | 5/2002 | Sugiyama ............. 375/232 |
| 6,438,168 | B2 | 8/2002 | Arye |
| 6,480,541 | B1 | 11/2002 | Girod et al. |
| 6,526,099 | B1 | 2/2003 | Chistopoulos et al. |
| 6,549,561 | B2 | 4/2003 | Crawford |
| 6,584,509 | B2 | 6/2003 | Putzolu |
| 6,714,202 | B2 | 3/2004 | Dorrell |
| 6,724,726 | B1 | 4/2004 | Coudreuse |
| 6,748,020 | B1 | 6/2004 | Eifrig et al. |
| 6,760,674 | B2 * | 7/2004 | Bombard ............... 702/76 |
| 6,975,582 | B1 * | 12/2005 | Karabinis et al. ........ 370/204 |
| 2001/0026591 | A1 | 10/2001 | Keren et al. |
| 2002/0094044 | A1 * | 7/2002 | Kolze et al. ........... 375/346 |
| 2002/0106022 | A1 | 8/2002 | Satoh et al. |
| 2002/0110193 | A1 | 8/2002 | Yoo et al. |
| 2002/0138259 | A1 | 9/2002 | Kawahara |
| 2002/0145931 | A1 | 10/2002 | Pitts |
| 2002/0196851 | A1 | 12/2002 | Lecoutre |
| 2003/0093661 | A1 | 5/2003 | Loh et al. |
| 2003/0152148 | A1 | 8/2003 | Laksono |
| 2005/0180519 | A1 * | 8/2005 | Betts ................ 375/260 |

FOREIGN PATENT DOCUMENTS

| | | |
|---|---|---|
| EP | 0739138 A2 | 10/1996 |
| EP | 0805599 A2 | 11/1997 |
| EP | 0855805 A2 | 7/1998 |
| EP | 0896300 B1 | 2/1999 |
| EP | 0901285 A1 | 2/1999 |
| EP | 0955607 A2 | 11/1999 |
| EP | 1032214 A2 | 8/2000 |
| JP | 07-210670 A | 8/1995 |
| WO | WO 01/95633 A2 | 12/2001 |
| WO | WO 02/080518 A2 | 10/2002 |

OTHER PUBLICATIONS

Jae-Young Pyun, "QoS Provisioning for Video Streaming over IEEE 802.11 Wireless LAN," (abridged) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

Manoj Aggarwal and Ajai Narayan, "Efficient Huffman Decoding," 2000 IEEE, 0-7803-6297-7, pp. 936-939.

Peng Yin et al., "Video Transcoding by Reducing Spatial Resolution," Princeton University, Princeton, NJ, 4 pp. 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date unknown).

Luis Ducla Soares et a., "Influence of Encoder Parameters on the Decoded Video Quality for MPEG-4 Over W-CDMA Mobile Networks," NTT DoCoMo, Inc. technical paper, 4 pp. (date unknown).

Thomas Wiegand et al., "Long-Term Memory Motion-Compensated Prediction for Rubust Video Transmission," in Proc. ICIP2000, 4 pp.

P. Greg Sherwood et al., "Efficient Image and Channel Coding for Wireless Packet Networks," Univ. of CA, San Diego, CA, Dept. of ECE, 4 pp. (date unknown).

Donghoon Yu et al., "Fast Motion Estimation for Shape Coding in MPEG-4," 2003 IEEE Transactions on Circuits and Systems for Video Technology, vol. 13, No. 4, Apr. 2003, pp. 358-363.

Yu, Donghoom, et al., "Fast Motion Estimation for Shape Coding in MPEG-4," IEEE Transactions on Circuits and Systems for Video Technology, vol. 13, No. 4, 2003 IEEE, Apr. 2003, pp. 358-363.

Pyun, Jae-Young, "QoS Provisioning for Video Streaming Over IEEE 802.11 Wireless LAN," abridged) IEEE Conferences in Consumer Electronics, Jun. 16, 2003, EE Times, Seoul, Korea, <http://eetimes.com/printableArticle?doc_id=OEG2003061S0070> retrieved Jul. 8, 2003.

Youn, Jeongnam et al.. "Video Transcoding For Multiple Clients," Proceedings of the SPIE, Bellingham, VA. vol. 4067, XP008012075, pp. 76-85, University of Washington, Sealttle, WA.

Lengwehasatit, Krisda et al., "Computationally Scalable Partial Distance Based Fast Search Motion Estimation," Packet Video Corp., San Diego, California.

Takahashi, Kuniaki, et al., "Motion Vector Synthesis Algorithm for MPEG2-to-MPEG4 Transcoder," Proceedings of the SPIE, Bellingham, VA, vol. 4310, Sony Corporation, XP008000078, pp. 387-882, 2001 SPIE.

Soares, Luis Ducla, et al., "Influence of Encoder Parameters on the Decoded Video Quality for MPEG-4 Over W-CDMA Mobile Networks," NTT DoCoMo, Inc.

Aggarwal, Manoj et al., "Efficient Huggman Decoding," 2000 IEEE, 0-7803-6297-7, pp. 936-939, University of Illinois at Urbana-Champaign, Urbana, IL.

Sherwood, P. Greg et al., "Efficient Image and Channel Coding for Wireless Packet Networks," University of California, La Jolla, California.

Assuncao, Pedro et al., "Rate Reduction Techniques for MPEG-2 Video Bit Streams," SPIE, vol. 2952, Apr. 1996, pp. 450-459, University of Essex, Colchester, England.

Yin, Peng et al., "Video Transcoding by Reducing Spatial Resolution," Princeton University, 2000, Princeton, New Jersey.

Shanableh, Tamer et al., "Heterogeneous Video Transcoding to Lower Spatio-Temporal Resolutions and Difference Encoding Formats," IEEE Transactions on Multimedia, vol. 2, No. 2, Jun. 2000, pp. 101-110, Engineering and Physical Sciences Researc Counsel, Colchester, U.K.

Wiegand, Thomas et al., "Long-Term Memory Motion-Compensated Prediction for Rubust Video Transmittion," in Proc. ICIP 2000, University of Erlangen-Buremberg, Erlangen, Germany.

Fan, Zhigang et al. "Maximum Likelihood Estimation of JPEG Quantization Table in the Identification of Bitmap Compression History," Xerox Corporation, Webster, New York.

Thomas, Shine M. et al., "An Efficient Implentation of MPEG-2 (BC1) Layer 1 & Layer 2 Stereo Encoder on Pentium-III Platform", pp. 1-10, Sasken Communication Technologies Limited, Bangalore, India.

Ramanujan, Ranga S. et al., "Adaptive Streaming of MPEG Video Over IP Networks," 22nd IEEE Conference on Local Computer Networks (LCN '97), Nov. 2-5, 1997, 1997 IEEE, pp. 398-409, Architecture Technology Corporation, Minneapolis, MN.

Rejaie, Reza et al., "Architectural Considerations for Playback of Quality Adaptive Video Over the Internet," XP002177090. 2000 IEEE pp. 204-209, AT&T Labs, Menlo Park, California.

Bouras, C. et al., "On-Demand Hypermedia/Multimedia Service Over Broadband Networks," XP-002180545, 1996 IEEE Proceedings of HPDC-5 '96, pp. 224-230, University of Patras, Patras, Greece.

Chalidabhongse, Junavit et al., "Fast Motion Vector Estimation Using Multiresolution-Spatio-Temporal Correlations," IEEE Transactions On Circuits and Systems For Video Technology, vol. 7, No. 3 Jun. 1997, pp. 477-488.

Oh, Hwang-Seok et al., "Block-Matching Algorithm Based On An Adaptive Reduction of the Search Area For Motion Estimation," Real-Time Imaging, Academic Press Ltd., vol. 56, No. 5, Oct. 2000, pp. 407-414, XP004419498 ISSN: 1077-2014, Taejon, Korea.

Lee, Liang-Wei et al., "Dynamic Search-Window Adjustment and Interlaced Search for Block-Matching Algorithm," IEEE Transactions on Circuits and Systems for Video Technology, IEEE, vol. 3, No. 1, Feb. 3, 1993, pp. 85-87, XP000334581 ISSN: 1051-8215, New York.

Fukunaga, Shigeru et al., "MPEG-4 Video Verification Model Version 16.0" International Organization for Standardization: Coding of Moving Pictures and Audio, vol. N3312, Mar. 2000, pp. 1-380, XP000861688.

Kroner, Sabine et al., "Edge Preserving Noise Smoothing With An Optimized Cubic Filter," DEEI, University of Trieste, Trieste, Italy.

Kim, Jaemin et al., "Spatiotemporal Adaptive 3-D Kalman Filter for Video," pp. 1-12. Samsung Semiconductor, Inc. San Jose, Calfiornia.

Liu, Julia J., "ECE497KJ Course Project: Applications of Wiener Filtering In Image and Video De-Noising," pp. 1-15, May 21, 1997.

Jostschulte, K. et al., "A Subband Based Spatio-Temporal Noise Reduction Technique for Interlaced Video Signals," University Dortmund, Dortmund, Germany.

Kossentini, Faouzi et al. "Predictive RD Optimized Motion Estimation for Very Low Bit-Rate Video Coding," 1997 IEEE, XP-000726013, pp. 1752-1963, Sep. 1, 1996, 1997 International Conference on Image Processing, Vancouver, Canada.

Tourapis, Alexis et al. "New Results on Zonal Based Motion Estimation Algorithms—Advanced Predictive Diamond Zonal Search," 2001 IEEE, pp. V 183-V 186, The Hong Kong University of Science and Technology, Clear Water Bay, Kowloon, Hong Kong.

Brandenburg, Karlheinz, "MP3 and AAC Explained," Proceedings of AES 17th International Conference, XP008004053, pp. 99-110, Erlangen, Germany.

Painter, Ted et al., "Perceptual Coding of Digital Audio," Proceedings of the IEEE, vol. 88, No. 4, Apr. 2000, pp. 451-513, XP001143231, ISSN: 0018-9219, Arizona State University, Tempe, AZ.

Hassanzadegan, Hooman et al., "A New Method for Clock Recovery in MPEG Decoders," pp. 1-8, Basamad Negar Company, Tehran, Iran.

Kan, Kou-Sou et al., "Low-Complexity and Low-Delay Video Transcoding for Compressed MPEG-2 Bitstream," Natinal Central University, Chung-Li, Taiwan.

Mitchell et al., "MPEG Video Compression Standard: 15.2 Encorder and Decorder Buffering," Chapman and Hall Digital Multimedia Standards Series, pp. 340-356, XP002115299, ISBN: 0-412-08771-5, Chapman and Hall, New York.

Whybray, M.W. et al., "Video Coding—Techniques, Standards and Applications," BT Technol J. vol. 14, No. 4, Oct. 4, 1997, pp. 86-100, XP000722036.

"Sharp Product Information: VTST-Series NTSC/PAL Electronic Television Tuners," RF Components Group, Sharp Microelectronics of the America, 1997.

Edwards, Larry M., "Satisfying Your Need for Net Speed," San Diego Metropolitan, Sep. 1999, <<www.sandiegometro.com/1999/sept/speed.html>>, retrieved on Jul. 19, 2001.

Oz, Ran et al., "Unified Headend Technical Management of Digital Services," BigBend Networks, Inc.

Muriel, Chris, "What is Digital Satellite Television?," What is Digital Television Rev. 3.0, Apr. 21, 1999, SatCure, Sandbach, England, <<http://www.netcentral.co.uk.satcure/digifaq.htm>>, access on Apr. 20, 2001.

"Conexant Products & Tech Info: Product Briefs: CX24108," 2000-2002 Conexant Systems, Inc. access on Apr. 20, 2001.

"Conexant Products & Tech Info: Product Briefs: CX22702," 2000-2002 Conexant Systems, Inc. access on Apr. 20, 2001.

"TDC: Components for Modems & Digital Infotainment: Direct Broadcast Satellite Chipset," 2001 Telecom Design Communications Ltd., U.K., <<http://www.tdc.co.uk/modmulti/settop/index.htm>>, access on Apr. 20, 2001.

"White Paper: Super G: Maximizing Wireless Performance," Mar. 2004, Atheros Communications, Inc., pp. 1-20, Document No. 991-00006-001, Sunnyvale, California.

Kwok, Y.K. et al., "Efficient Multiple Access Control Using a Channel-Adaptive Protocol for a Wireless ATM-Based Multimedia Services Network," Mar. 29, 2000, Computer Communications 24(2001) 970-983, University of Hong Kong, Hong Kong, PRC.

Liang, Ying-Chang et al., "Joint Downlink Beamforming, Power Control, and Data Rate Allocation for DS-CDMA Mobile Radio with Multimedia Services," 2000 IEEE, pp. 1455-1457, Ceneter for Wireless Communication, Singapore.

Razavi, Behzad, "Challenges in Portable RF Transceiver Design," Sep. 1996, 1996 IEEE, pp. 12-25, Circuits & Devices.

Mannion, Patrick, "IceFyre Device Cools 802.11a Power Consumption," Sep. 24, 2001, Planet Analog, National Semiconductor, <<http://www.planetanalog.com/story/OEG20010924S0079>>, access on Nov. 5, 2001.

"Ice Fyre Semiconductor: IceFyre 5-GHz OFDM Modem Solution," Sep. 2001, pp. 1-6, IceFyre: Rethink Wireless, IceFyre Semiconductor, Inc.

Pozar, David M., "Theory and Design of Ferrimagnetic Components," 1990, pp. 529, Microwave Engineering. Addison-Wesley Publishing Company, Inc.

"Part 11: Wireless LAN Medium Access Control (MAC) and Physical Layer (PHY) Specifications: High-Speed Physical Layer in the 5 GHz Band," 1999 IEEE, pp. 1-83, Supplement to IEEE Standard fo rInformation Technology, IEEE Std 802.11a-1999, LAN/MAN Standards Committee.

Ciciora, Walter S., "Cable Television in the United States: An Overview," May 25, 1995, pp. 1-90, Cable Television Laboratories, Inc., Louisville, Colorado.

\* cited by examiner

SYSTEM FOR ALLOCATING DATA IN A COMMUNICATIONS SYSTEM AND METHOD THEREOF

FIELD OF THE DISCLOSURE

The present disclosure relates generally to improving data channel reliability and more specifically to improving data channel reliability in a multi-carrier communications system.

BACKGROUND

Multiple carrier modulation systems are known in communication applications. Multiple frequency carriers within an assigned channel, i.e. frequency block, are used for transmitting data. Each of the frequency carriers is modulated with a particular set of data to be transmitted, and power is assigned to each of those frequency carriers.

As shown in prior-art FIG. 1, all of the frequency carriers, carriers 115, of an assigned data channel, identified by full bandwidth 110, can be used to transmit data concurrently. Full bandwidth 110 includes a range of frequencies from a minimum frequency F1 to a maximum frequency F2. As each carrier of carriers 115 is associated with a power, a power spectral density (PSD), such as full bandwidth PSD 120, with a root-mean-square (rms) power level of $P_1$, can be associated with a transmission of carriers 115. Full bandwidth PSD 120 represents a PSD associated with a transmission using a majority of the frequency carriers associated with full bandwidth 110 concurrently. However, not all of the frequency carriers of carriers 115, within full bandwidth 110, can necessarily be received well by a receiving system.

A receiving system can have problems identifying data from some of the carriers of carriers 115. Noise within the full bandwidth 110 can be too large for carriers to be distinguished. Noise floor 130 identifies an average level of noise within the channel having an rms power level $P_N$. If the power associated with the carriers is not significantly greater than $P_N$, the data associated with the carriers may not be properly identified. Furthermore, interference from other carriers or other signals can make data reception difficult. Noise and interference affect the probability that data will be reliably received across a particular channel. To improve channel reliability, the power associated with carriers 115 should be greater than the noise or interfering signals within the channel, or full bandwidth 110.

A prior art method of making the carriers distinguishable over noise or interference is to increase the power of the carriers well above the power of the noise or interference. As shown in prior art FIG. 2, a power associated with the carriers 215 within the channel, identified by full bandwidth 110, has been increased. A new PSD, modified PSD 220, is shown to identify a PSD, with a maximum power level of $P_2$, associated with carriers 215 at the increased power levels. The increase in power makes the carriers 215 distinguishable over the noise floor 130. A nominal PSD 225 is used to identify a PSD, at an average power level of $P_1$, of the carriers 215 at a normal power level, such as full bandwidth PSD 120 (prior art FIG. 1). A PSD mask associated with nominal PSD 225 is often used to identify average PSD levels that are not to be exceeded, according to particular communications specifications. To avoid transmissions of the data channel, which may interfere with transmissions of nearby data channels, the PSD of the data channel is kept within the nominal PSD 225. However, by increasing the power of the carriers to be well above the noise and interference, modified PSD 220 well exceeds the nominal PSD 225, possibly creating interference for other data channels. From the above discussion, it should be apparent that an improved method of increasing channel reliability, while not compromising a quality of adjacent channels, is needed.

BRIEF DESCRIPTION OF THE DRAWINGS

Specific embodiments of the present disclosure are shown and described in the drawings presented herein. Various advantages, features and characteristics of the present disclosure, as well as methods, operations and functions of related elements of structure, and the combination of parts and economies of manufacture, will become apparent upon consideration of the following description and claims with reference to the accompanying drawings, all of which form a part of this specification, and wherein:

DETAILED DESCRIPTION OF THE FIGURES

FIGS. 3-7 describe methods and systems for improving communications reliability. One method includes identifying a first number of usable frequency bins to be supported. The number of usable frequency bins is selected from a set of usable frequency bins associated with a channel. In one embodiment, the number of usable frequency bins to be supported is selected to improve a transmission property, such as a signal to noise ratio, a bit error rate, an amount of data to be sent, a received packet retransmission request, or channel reliability. The method also includes allocating data to a first predetermined set of usable frequency bins. The predetermined set of usable frequency bins indicates particular usable frequency bins of the channel bandwidth. The data is allocated to activate frequency bins, up to the number of usable frequency bins, to meet a nominal power spectral density. The method further includes providing data to the first predetermined set of usable frequency bins.

Figure 3:
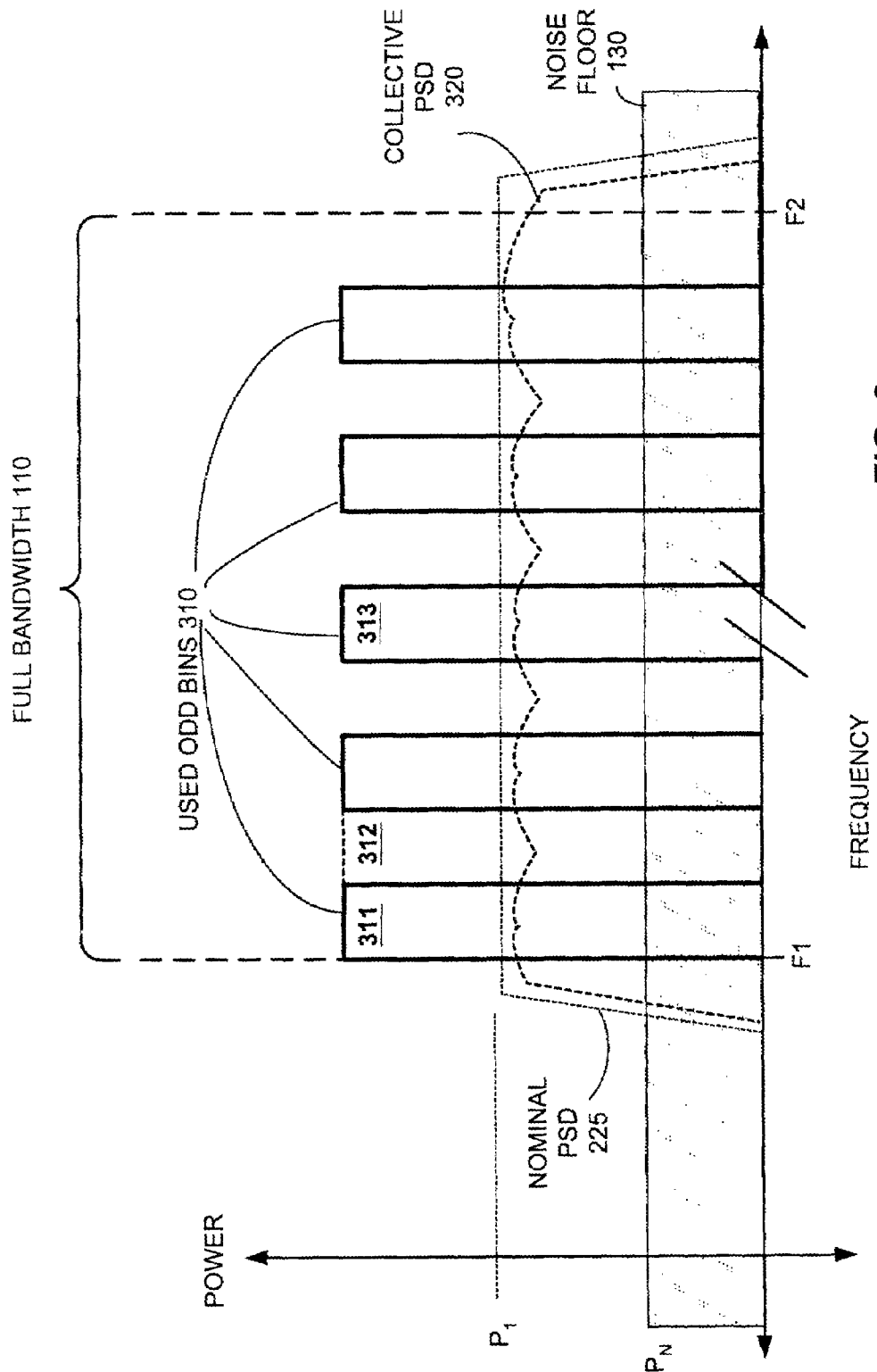
FIG. 3 is a frequency spectrum plot illustrating transmission using a first set of frequency bins, according to one embodiment of the present disclosure.

Referring now to FIG. 3, a frequency spectrum plot illustrating transmission using an odd set of frequency bins is shown, according to one embodiment of the present disclosure. In this embodiment, it has been determined that a transmitting system is to use half of the total number of frequency bins associated with a particular data channel identified. The determination to only use half of the total number of frequency bins may be based on a maximum amount of data to be transferred and a maximum number of bits per symbol assigned to each frequency bin. With approximately half of the total number of bins being used, a transmission power provided to frequency carriers associated with the frequency bins may be increased to overcome noise or signal interference, thereby improving channel reliability. In this example, each used bin can be provided twice as much power as when all the frequency bins are used while maintaining a constant transmission power as when all the frequency bins are used.

Channel reliability can be determined in consideration of a maximum information capacity associated with the channel. Transmissions over a single data channel can be limited by the amount of data or information capacity that can be reliably transmitted across the single data channel. The information capacity theorem describes a relationship between a maximum amount of data that can be transmitted per unit time or information capacity, "C" of a particular channel, a channel bandwidth, "B", such as full bandwidth 110, and a signal to noise ratio, "SNR". The signal to noise ratio identifies the ratio of the power of the carriers within the channel to the power of the noise. One representation of the information capacity theorem can express channel capacity in bits per second according to the following equation:

$C=B \log_2(1+SNR)$ bits per second.

Communicating over a fixed bandwidth, an improvement to the channel reliability is achieved through an increase in the power of the carriers, thereby increasing the signal to noise ratio. While the transmission power per carrier is increased in used odd bins 310, the average transmission power of all used bins remains equal to or less than an average transmission power associated with using all of the frequency bins or frequency carriers at once. By spreading the used frequency bins across the data channel, the transmission power may be spread over full bandwidth 110.

The frequency bins to be used can be spread across the data channel according to a specific pattern. In this example, since only half of the bins are needed, a pattern can be used consisting of only every other frequency bin. The frequency bins may be distributed with substantially uniform spacing between them. Accordingly, used odd bins 310 include a set of odd frequency bins in the data channel, while spacing between each of the frequency bins of used odd bins 310 represents unused even bins. A first odd bin 311 may be associated with the lowest frequency carrier within the data channel. The frequency carriers associated with the used odd bins 310 can be allocated enough extra power so that the signal level of each used odd bin 310 is substantially greater than noise floor 130, thereby improving a signal to noise ratio associated with the data channel and a channel reliability, as subsequently discussed in reference to FIG. 6. In one embodiment, only used odd bins 310 are used to transmit data. A collective PSD 320 is averaged over the full bandwidth 110 and remains lower than or equal to a nominal PSD 225. In an alternate embodiment, transmissions switch between the used odd bins 310 and a set of used even bins, subsequently discussed in reference to FIG. 4, an average PSD, collective PSD 320, associated with the used odd bins 310 and the set of used even bins is lower than or equal to the nominal PSD 225. The nominal PSD 225 can be associated with a nominal PSD occurring during a normal mode of operation or a PSD mask. It should be appreciated that the power associated with the frequency carriers of the used odd bins 310 is increased in respect to the power supplied to that same bin during a normal mode of operation. By increasing the power of used odd bins 310, the collective PSD 320 matches or remains below the nominal PSD 225. By keeping the collective PSD 320 below the nominal PSD 225, interference to other data channels with frequencies adjacent to the frequencies within full bandwidth 110 may be avoided. It should be noted that the term adjacent is used to describe sets of frequencies that are closer to each other within the frequency spectrum than other sets of frequencies. For example, a set of frequencies associated with a first odd bin 311 is adjacent to a set of frequencies associated with an unused frequency bin 312. However, the set of frequencies associated with first odd bin 311 is not adjacent to a set of frequencies associated with a second odd bin 313.

Figure 4:
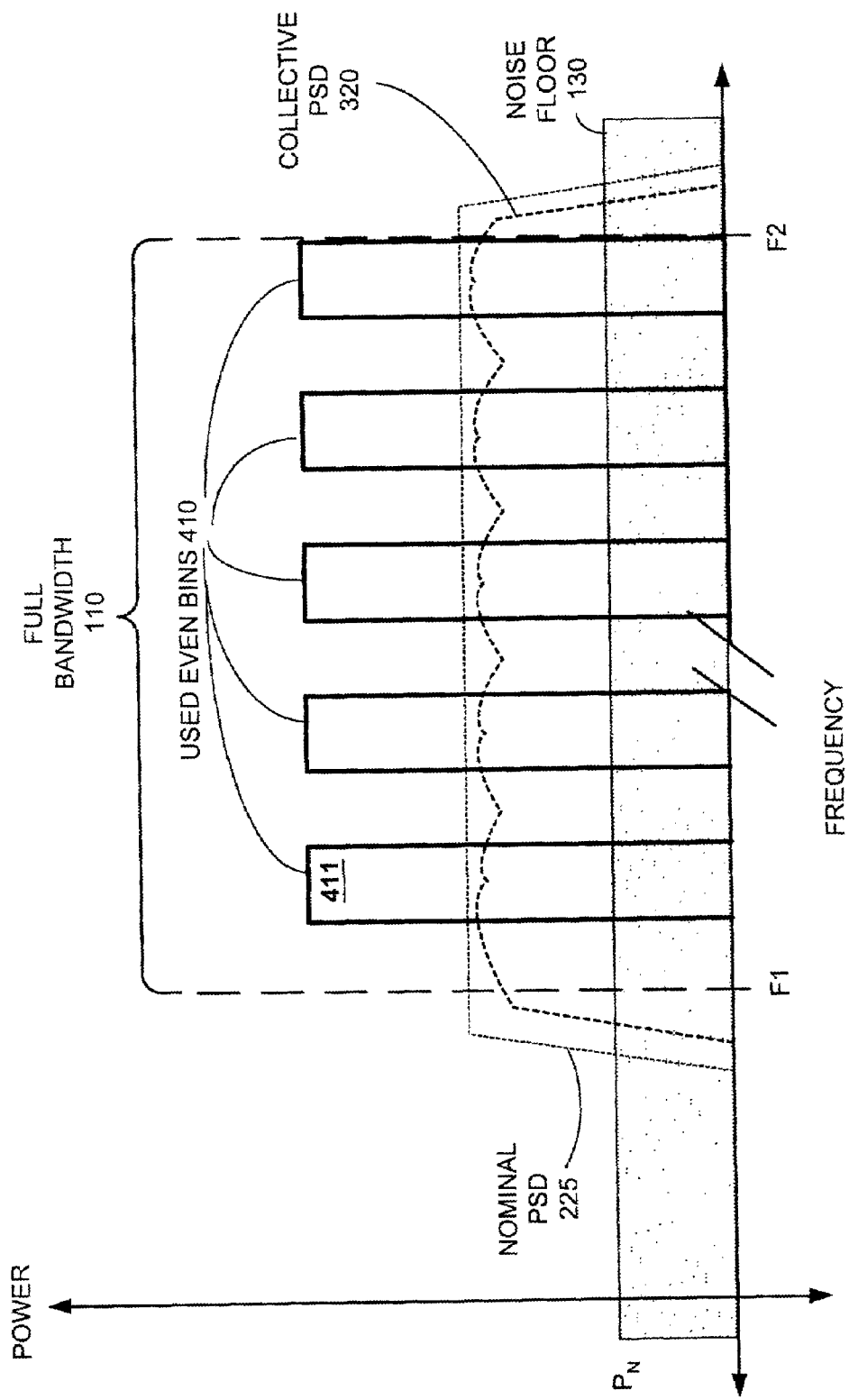
FIG. 4 is a frequency spectrum plot illustrating transmission using a second set of frequency bins, orthogonal to the set of frequency bins identified in FIG. 3, according to one embodiment of the present disclosure.

Referring now to FIG. 4, a frequency spectrum plot illustrating transmission using an even set of frequency bins is shown, orthogonal to the odd set of frequency bins identified in FIG. 3, according to one embodiment of the present disclosure. As discussed in reference to FIG. 3, a number of frequency bins to be supported can be half of the total number of frequency bins associated with a data channel, with full bandwidth 110. The frequency bins to be used are provided more transmission power and allocated across full bandwidth 110. To allow a collective PSD 320, associated with used even bins 410 and used odd bins 310, to remain below a nominal PSD 225, the transmitting system switches between activating the used even bins 410 and the used odd bins 310 (FIG. 3), wherein the used even bins 410 are orthogonal to the used odd bins 310.

Power to carriers associated with used even bins 410 are increased in comparison to power assigned to all the carriers within full bandwidth 110 in a normal mode. In one embodiment, the set of used frequency bins identified by used even bins 410 are substantially orthogonal to the set of frequency bins identified by used odd bins 310 in that used even bins 410 include frequency bins not active in used odd bins 310 and used odd bins 310 include frequency bins not active in used even bins 410. The pattern of bins identified by used even bins 410 may be recognized as being an inverse of the pattern of bins identified by used odd bins 310. The frequency bins in used even bins 410 are not used at the same time as the frequency bins of used odd bins 310. In one embodiment, the transmitting system uses only the used even bins 410 to transmit data, allowing the average PSD, collective PSD 320, to remain below nominal PSD 225. Alternatively, the transmitting system can switch between the sets of used bins 310 and 410, allowing the average PSD, collective PSD 320, to remain lower than nominal PSD 225. A first even bin 411 is associated with a frequency carrier adjacent to first odd bin 311 (FIG. 3). In comparison, the frequency carrier associated with first even bin 411 (analogous to unused frequency bin 312 of FIG. 3) is not adjacent to a frequency carrier associated with second odd bin 313 (FIG. 3). It should be appreciated that other frequency bin use patterns can be employed without departing from the scope of the present disclosure, as subsequently discussed in reference to FIG. 5.

Figure 5:
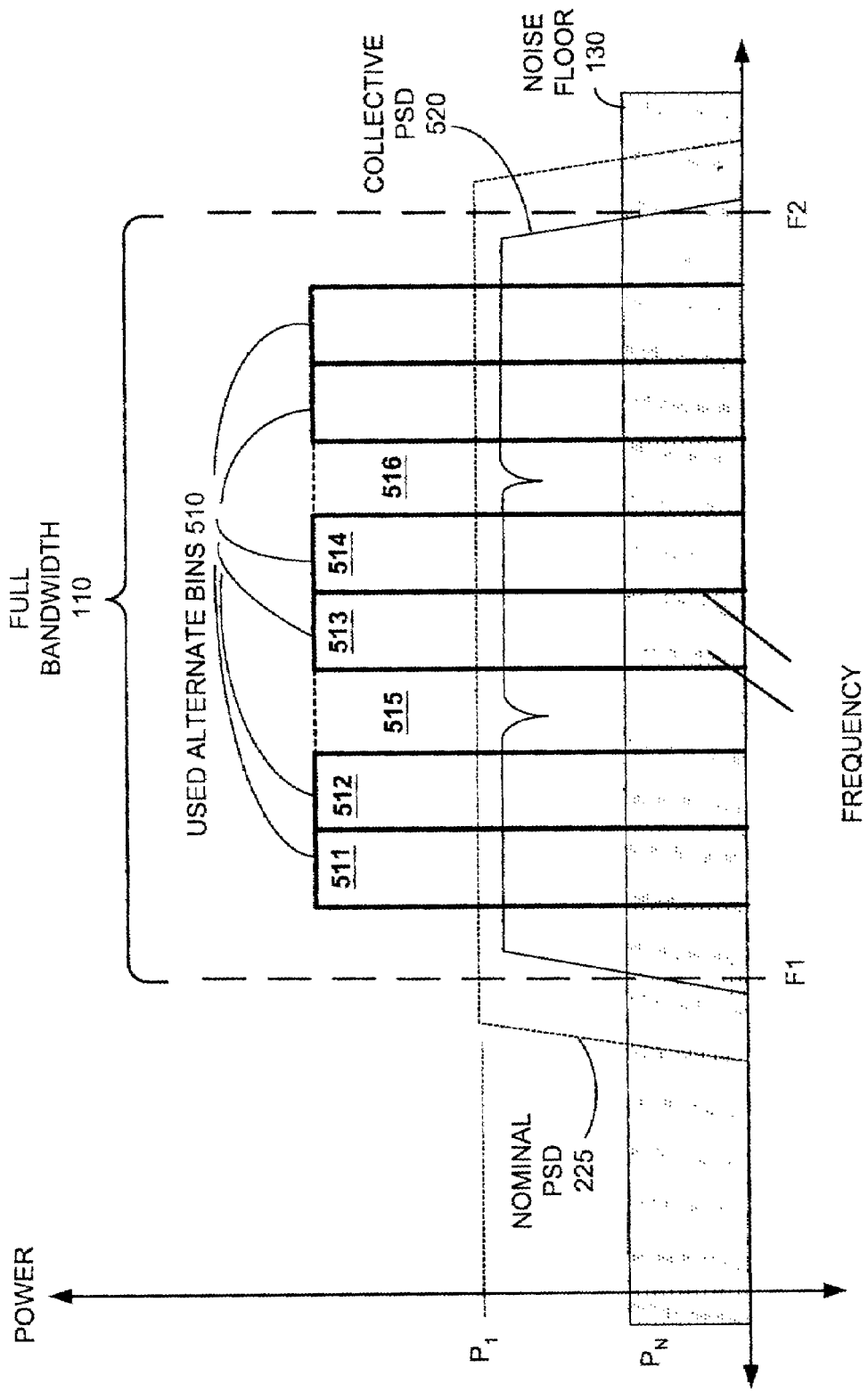
FIG. 5 is a frequency spectrum plot illustrating transmission using an alternate set of frequency bins, according to one embodiment of the present disclosure.

Referring now to FIG. 5, a frequency spectrum plot illustrating transmission using an alternate set of frequency bins is shown, according to one embodiment of the present disclosure. In one embodiment, it can be determined that only two-thirds of the total frequency bins used within a data channel identified within full bandwidth 110, are needed. Accordingly, a pattern of frequency bins can be established as described in used alternate bins 510. Accordingly, a pattern of two adjacent frequency bins can be selected for every three adjacent frequency carriers. Adjacent frequency bins are frequency bins that are associated with frequency carriers substantially closer to each other in frequency than other frequency carriers. Power is increased to the frequency carriers associated with used alternate bins 510 to improve the ratio of the frequency carrier signal to the noise floor 130.

First and second alternate bins 511 and 512 are adjacent and followed by an unused frequency bin. Third and fourth alternate bins 513 and 514 are allocated to frequency carriers adjacent to the unused frequency bin. Accordingly, substantially two-thirds of the frequency bins within full bandwidth 110 are used. The use of particular frequency bins can be rotated among available frequency bins to allow unused frequency bins to be included in subsequent transmissions. By rotating the use of the frequency bins, a collective PSD associated with used alternate bins 510 may be smoothed out over full bandwidth 110 and remain below the nominal PSD 225, despite a selective increase in power to the frequency carriers associated with the used alternate bins 510. For example, a first symbol could activate bins 511, 512, 513, 514, 517 and 518. The pattern of bins used could then rotate. A next symbol could activate bins 512, 515, 514, 516, 518 and 519. A third symbol could activate bins 511, 515, 513, 516, 517 and 519. The pattern of bins used could then rotate. Accordingly, the next symbol could activate bins 511, 512, 513, 514, 517 and 518 again.

Figure 6:
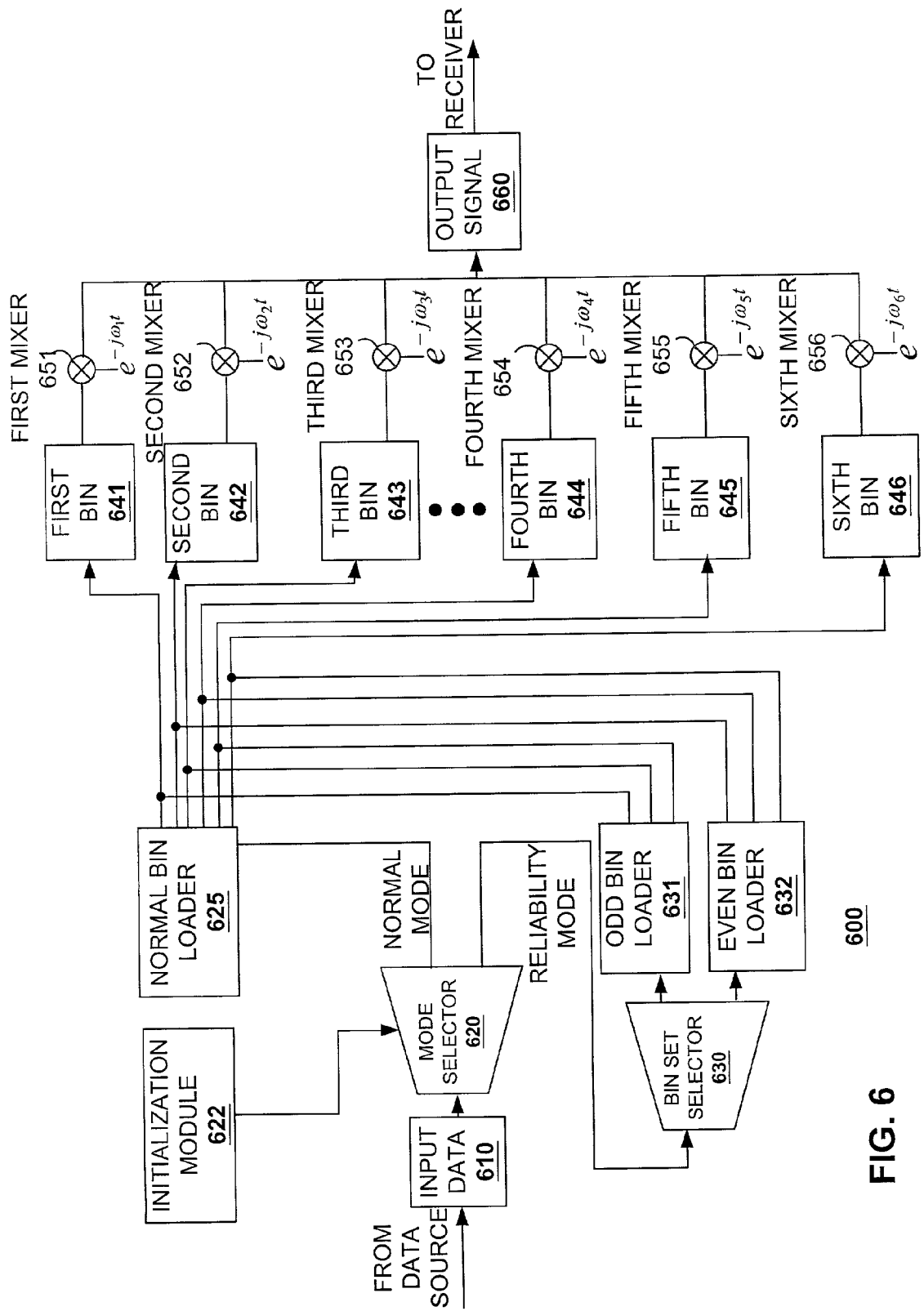
FIG. 6 is a block diagram illustrating a communications system for allocating data to separate frequency bins for improving communications reliability, according to one embodiment of the present disclosure.

Referring now to FIG. 6, a block diagram illustrating a communications system for allocating data to separate frequency bins to improve data channel reliability is shown and generally referenced as system 600, according to one embodiment of the present disclosure. A set of data to be transmitted is sent across a first set of bins, such as bins 641, 643, and 645, in one instance, and a second set of bins, such as bins 642, 644, and 646, in another instance. Power to each of the carriers in one of the sets of bins is increased to improve channel reliability.

Different frequency bins can be assigned to particular frequency carriers within the data channel. Bins 641-646 are each assigned to unique frequency carriers. While transmitting data using all the bins 641-646 concurrently, with an increased power assigned to all the carriers to improve channel reliability, can violate a particular PSD mask or predetermined nominal PSD, alternating between the first set of bins, bins 641, 643, and 645, and the second set of bins, 642, 644, and 646, allows the average PSD to remain within the PSD mask even though the power allocated to each used bin is above the nominal power. Accordingly, the power to the carriers can be increased to improve channel reliability without increasing the average PSD above a nominal PSD or PSD mask.

System 600 includes an initialization module 622 to identify a particular mode to run in, such as a normal mode in which all or most of the bins 641-646 are used at a normal power, or a high reliability mode in which the system uses only the first set of bins or the second set of bins at one time and the power provided to individual bins is higher than the power provided to individual bins in the normal mode. Recall that although the power used by individual bins is increased, the total power used by all the bins combined is not increased.

In one embodiment, the initialization module 622 determines a current reliability associated with the channel in the normal mode. Reliability can be based on a received signal to noise ratio. In one embodiment, a receiving system (not shown) transmits a message indicating a received signal to noise ratio to the transmitting system, system 600. Alternatively, a bit error rate (BER) can be used to determine reliability. The receiving system can calculate a BER associated with data received on a particular carrier. The receiving system can then transmit the BER back to system 600.

Initialization module 622 can use the signal properties provided by the receiving system, such as the BER or signal to noise ratio, to determine whether to continue in the normal mode or switch to the high reliability mode.

Initialization module 622 can also determine the mode based on a best data rate to be used. Upon an initialization of system 600, initialization module 622 can be used to negotiate a data rate between system 600 and the receiving system. The data rate can be based on a maximum data rate accepted by the receiving system. Alternatively, system 600 can attempt running at different data rates and wait for the receiving system to determine which data rate is best. If the data rate is significantly low, initialization module 622 can switch to a high reliability mode. It should be noted that switching to the high reliability mode can also allow a faster data rate, without exceeding a maximum data rate of the receiving system, to be supported using the channel. The data rate can be increased or decreased by altering a number of bits per symbol assigned to each of the carriers.

A symbol is a signal, sent over a single carrier, representing a set of bits. The number of bits per symbol includes a number of bits to be represented in one instance of a carrier. As the number of bits per symbol is increased, the data rate is increased. It should be noted that while the number of bins or frequency carriers being used concurrently is less in the high reliability mode than in the normal mode, the number of bits per symbol may be increased per carrier in the high reliability mode. Accordingly the data rate can match or exceed a current data rate in the normal mode. In one embodiment, frequency bins associated with better transmission properties, such as a better signal to noise ratio, better BER, or better reliability than other frequency bins, use a higher number of bits per symbol than the other frequency bins. The initialization module 622 can also be used to determine a bin pattern to use to support the current data rate, as subsequently discussed in reference to FIG. 7. It should also be noted that the power assigned to each of the carriers could be increased through initialization module 622 if the high reliability mode is selected. It should be noted that other patterns of bins could be used in other embodiments. For example, in a high reliability mode, only a quarter of the total number of carriers may be used for a given symbol. Accordingly, each carrier could be allocated four times the nominal power. The pattern of used and unused carriers could then be repeated every fourth symbol.

Data is received from a data source (not shown) through an input data port 610. The data source includes a collection of data to be transmitted to a receiving system. The data is provided to a mode selector 620. Initialization module 622 can provide a signal to mode selector 620 to identify a particular mode, a normal mode or a high reliability mode, to be supported. If a normal mode is selected, the data can be provided to a normal bin loader 625. Normal bin loader 625 uses all of the bins 641-646 to transmit the data concurrently. A signal is modulated by received data in each of the bins 641-646. Each of the bins 641-646 are associated with a respective mixer 651-656, to mix the signal from the bins with an appropriate frequency for the particular carrier being used by the bin. For example, a modulated signal from first bin 641 is mixed at a first carrier frequency by a first mixer 651 and a modulated signal from second bin 642 is mixed at a second carrier frequency by a second mixer 652. The modulated carrier signals may then be provided through an output signal port 660.

If the high reliability mode is selected through mode selector 620, the data can be passed to a bin set selector 630. The bin set selector 630 switches between concurrently providing data through a first set of bins and concurrently providing data to a second set of bins. In the illustrated embodiment, the bins used to transmit data in the channel are split into two sets of bins. An odd set of bins including bins 641, 643, and 645, and an even set of bins including bins 642, 644, and 646. The bins of each set are generally selected across the channel to allow an average PSD to remain below a nominal PSD. The nominal PSD can be associated with a PSD generally resulting from the normal mode or a PSD mask associated with a particular communications standard. It should be appreciated that while every other bin is being selected in each set in the illustrated embodiment, other bin patterns can be selected, such as described in reference to FIG. 5, without departing from the scope of the present disclosure.

Figure 1:
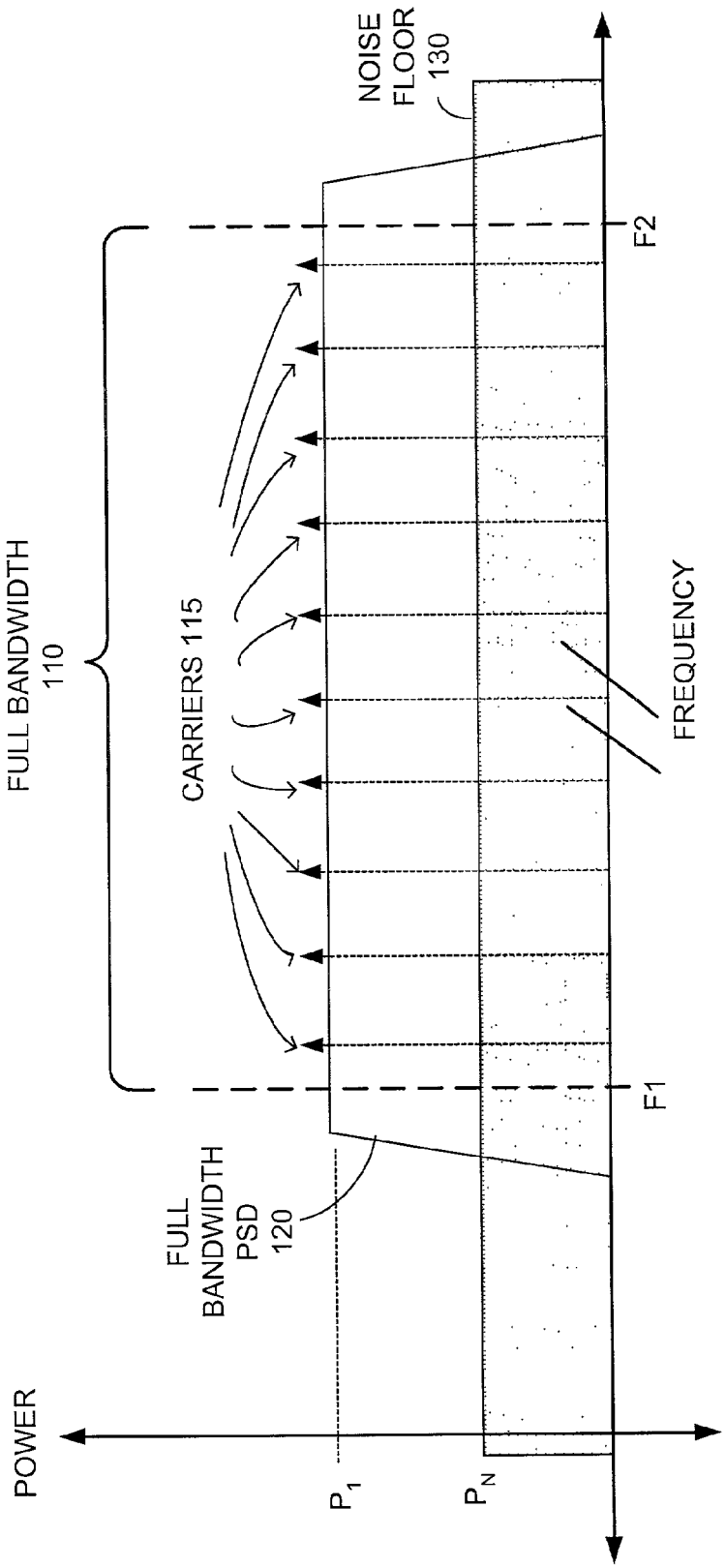
FIG. 1 is a frequency spectrum plot illustrating prior-art communications over a noisy channel.
Figure 2:
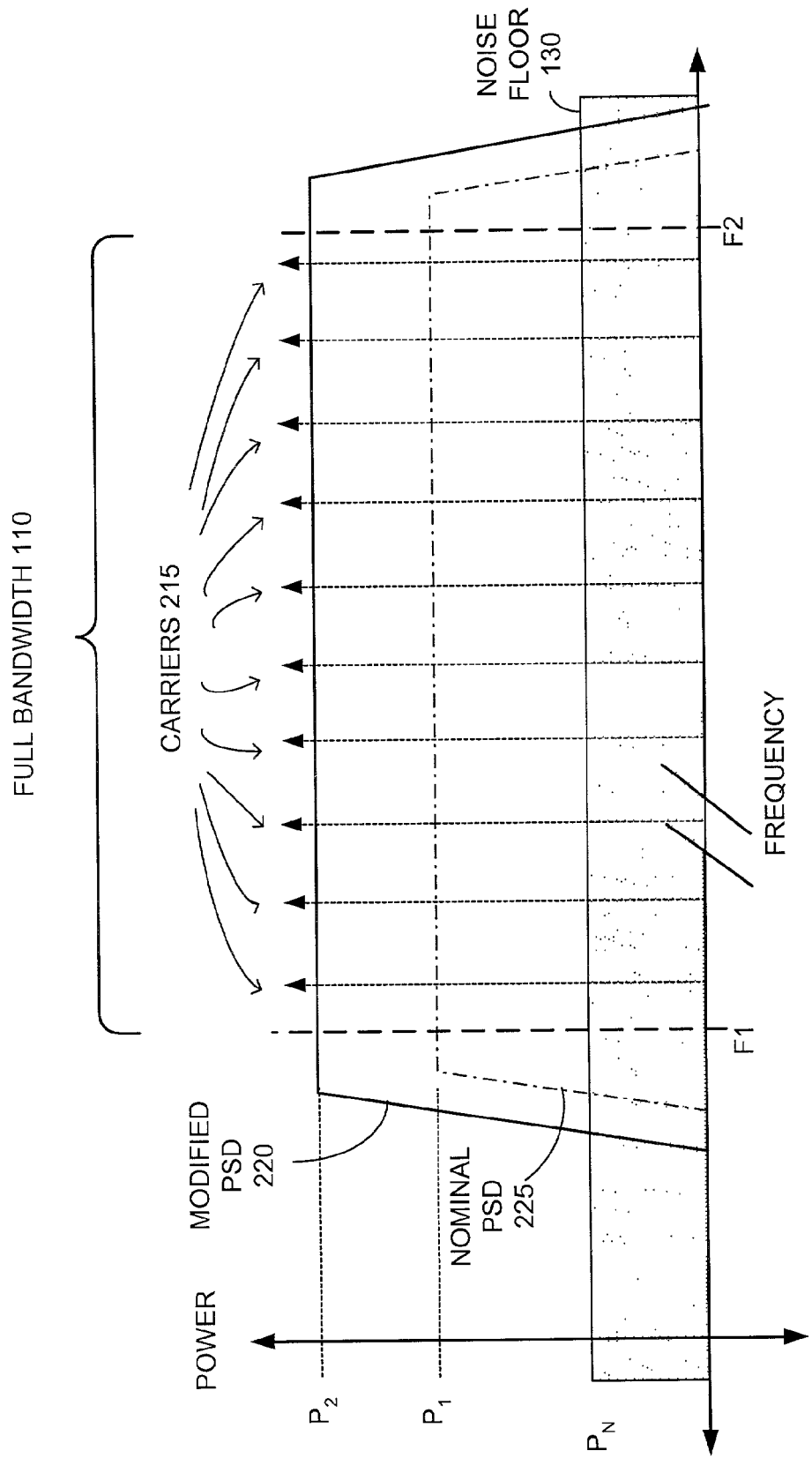
FIG. 2 is a frequency spectrum plot illustrating a prior-art method to improve communications over a noisy channel.

Data is provided to odd bin loader 631 through bin set selector 630. Odd bin loader 631 provides data to bins 641, 643, and 645 for concurrent transmission through the bins' respective carrier frequencies. In another instance, data is provided to even bin loader 632 through bin set selector 630. Even bin loader 632 provides the data to bins 632, 634, and 636 for concurrent transmission through their respective carrier frequencies. Bin set selector 630 continues to switch between odd bin loader 631 and even bin loader 632. In this example, at any instance, only every other bin and frequency carrier in the channel is active. Accordingly, while the power per each frequency carrier has been increased in the high reliability mode, the average PSD is still kept within the nominal PSD. It should be appreciated that while only frequency bins 641-646 are shown and discussed in FIG. 1, other frequency bins may also be included without departing from the scope of the present disclosure.

Figure 7:
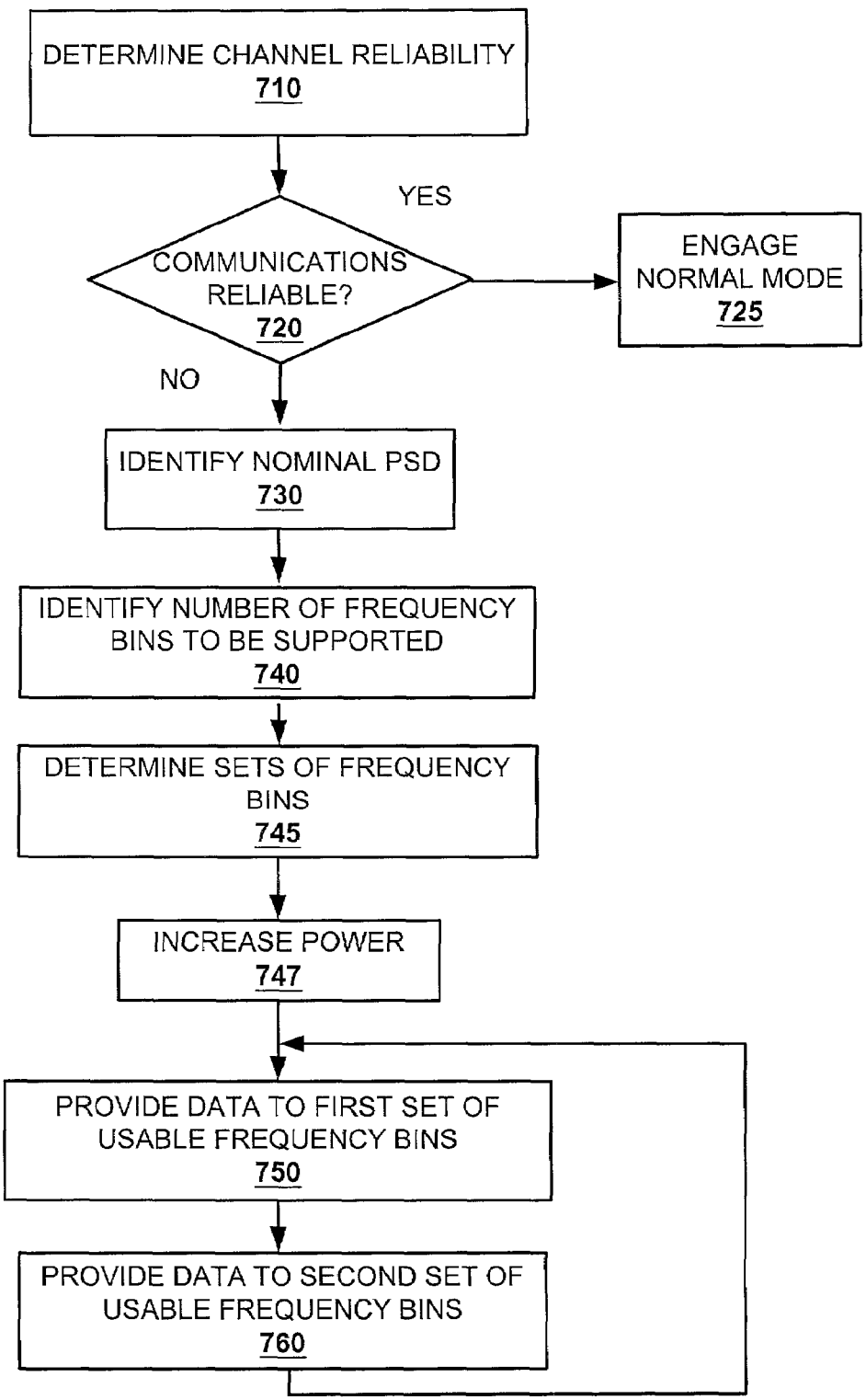
FIG. 7 is a flow diagram illustrating a method of improving communications reliability, according to one embodiment of the present disclosure.

Referring now to FIG. 7, a flow diagram illustrating a method of improving channel reliability is shown, according to one embodiment of the present disclosure. A transmitting system identifies and corrects for channel reliability. In step 710, the transmitting system determines channel reliability. As previously discussed, the channel reliability can be determined according to a current power associated with the carriers and a signal to noise ratio. Accordingly, the signal to noise ratio can be calculated by a receiving system and provided back to the transmitting system. Similarly a BER associated with data demodulated in a receiving system can be returned to the transmitting system. The transmitting system can also negotiate a data rate with the receiving system. If the best data rate to be used is low, the transmitting system can mark a current operating mode as unreliable, and switch to a more reliable communications mode.

In step 720, it is determined if the current mode of operation is reliable. If the transmitting system is operating within acceptable parameters, the transmitting system can decide to operate in a normal mode, as in step 725. In step 725, the transmitting system engages a normal communications mode in which most or all of the carriers associated with a data channel are used at a normal power. If the current operating mode is not reliable, the transmitting system can prepare to engage a high reliability mode. It should be noted that the transmitting system can engage the normal mode and the high reliability mode to determine which mode offers the best performance. Furthermore, the transmitting system may always operate in the high reliability mode to ensure proper reception of data.

In step 730, a nominal PSD is identified. In one embodiment, the nominal PSD is associated with a PSD of transmissions when the transmitting system is running in the normal mode. In another mode, the nominal PSD is associated with a PSD mask specified by a communications standard. For examples the IEEE 802.11a standard specifies an acceptable PSD template, measured over a 30 kHz bandwidth, for the transmitting system. In step 740, the transmitting system identifies a number of frequency bins to be supported. The number of frequency bins is selected from, and less than, a total number of usable frequency bins associated with the data channel. The number of frequency bins to be supported can be based on a data rate negotiated between the transmitting system and the receiving system. For example, by comparing the data rate with the number of bits represented by each carrier signal, the transmitting system can determine the number of frequency carriers or frequency bins necessary to support the data rate. It can be determined that only half of the frequency carriers of the data channel are needed. Or, for example, the transmitting system can determine it needs two-thirds of the maximum number of frequency carriers associated with the data channel. It should be noted that the total number of usable frequency bins associated with a data channel can be less than a maximum number of frequency bins associated with a data channel. Some frequency bins or frequency carriers associated with a data channel may be reserved for control data. For example, some bins may be dedicated to communicate the method of bin-mapping a transmitter is using in a high reliability mode.

In step 745, the transmitting system identifies sets of frequency bins to be supported. The sets of frequency bins include a number of frequency bins up to the number of frequency bins identified in step 740. The frequency bins of each set are selected in patterns to spread the usage of frequency carriers across the data channel. For example, if the number of frequency bins to be supported is half of the total number of frequency bins associated with the channel, a pattern of every other frequency bin can be selected, as discussed in reference to FIG. 3. If the number of frequency bins to be supported is one-third of the frequency bins, then the pattern of frequency bin in the frequency bin set may only include every third frequency bin. If two-thirds of the frequency bins are to be supported, the pattern of frequency bins can include a pattern of two used frequency bins followed by an unused frequency bin, as previously discussed in reference to FIG. 5. The frequency bins of each set of frequency bins should mostly include bins not used by another set of frequency bins. For example, a first set of frequency bins may include only odd frequency bins, and the second set of frequency bins may include only even frequency bins. The set, or sets, of frequency bins to be used can be stored, such as in a look-up table, and the transmitting system may only need to select the sets of frequency bins to match the number of frequency bins to be supported.

In step 747, power to each of the frequency carriers of the sets of frequency bins is increased to improve transmission reliability. The power can be increased up to a point at which an average PSD, which will be associated with a transmission using the sets of frequency bins, matches the nominal PSD identified in step 730. Instep 750, the transmitting system provides data to the first set of usable frequency bins determined in step 745. In one embodiment, after the data has been concurrently transmitted using the first set of frequency bins, the transmitting system disables the first set of frequency bins. In step 760, the transmitting system provides data to the second set of usable frequency bins determined in step 745. After the data has been concurrently transmitted using the second set of frequency bins, the transmitting system disables the second set of frequency bins. The transmitting system then returns to step 750 to re-enable the first set of frequency bins. Accordingly, the transmitting system cycles between the first and second set of frequency bins, allowing the average PSD to be smoothed out over the available bandwidth. Alternatively, the transmitting system may continue to use either the first set of frequency bins or the second set of frequency bins exclusively. By using only the first set of frequency bins or the second set of frequency bins at one time, the average PSD can remain lower or equivalent to the nominal PSD.

The systems described herein can be part of an information handling system. The term "information handling system" refers to any system that is capable of processing information or transferring information from one source to another. An information handling system can be a single device, such as a computer, a personal digital assistant (PDA), a hand held computing device, a cable set-top box, an Internet capable device, a cellular phone, and the like. Alternatively, an information handling system can refer to a collection of such devices. It should be appreciated that the system described herein has the advantage of improving data channel reliability without violating an established nominal power spectral density.

In the preceding detailed description of the embodiments, reference has been made to the accompanying drawings which form a part thereof, and in which is shown by way of illustration specific embodiments in which the disclosure can be practiced. These embodiments are described in sufficient detail to enable those skilled in the art to practice the disclosure, and it is to be understood that other embodiments can be utilized and that logical, mechanical and electrical changes can be made without departing from the spirit or scope of the disclosure. To avoid detail not necessary to enable those skilled in the art to practice the disclosure, the description may omit certain information known to those skilled in the art. Furthermore, many other varied embodiments that incorporate the teachings of the disclosure can be easily constructed by those skilled in the art. Accordingly, the present disclosure is not intended to be limited to the specific form set forth herein, but on the contrary, it is intended to cover such alternatives, modifications, and equivalents, as can be reasonably included within the spirit and scope of the disclosure. The preceding detailed description is, therefore, not to be taken in a limiting sense, and the scope of the present disclosure is defined only by the appended claims.

What is claimed is:

1. A method comprising:

performing, for a first duration, a first wireless transmission of data via a first set of frequency bins of a plurality of frequency bins associated with a bandwidth of a channel, the first wireless transmission having a transmission power for at least one frequency bin of the first set of frequency bins that exceeds a predetermined nominal power spectral density;

performing, for a second duration separate from the first duration, a second wireless transmission of data via a second set of frequency bins of the plurality of frequency bins, the second set separate from the first set, the second wireless transmission having a transmission power for at least one frequency bin of the second set of frequency bins that exceeds the predetermined nominal power spectral density, wherein the second set of frequency bins is unused during the first duration and the first set of frequency bins is unused during the second duration; and a collective power spectral density for the bandwidth averaged over the sum of the first duration and the second duration is not greater than the predetermined nominal power spectral density.

2. The method of claim 1, wherein the first set comprises even frequency bins of the plurality of frequency bins and the second set comprises odd bins of the plurality of frequency bins.

3. The method of claim 1, wherein the nominal power spectral density is associated with a power used to support all of the plurality of frequency bins.

4. The method of claim 1, further comprising:
determining the predetermined nominal power spectral density based on a transmission standard.

5. The method of claim 1, further comprising:
performing, for a third duration subsequent to the second duration, a third wireless transmission of data via a third set of frequency bins of the plurality of frequency bins, the third set separate from the first set and the second set, the third wireless transmission having a transmission power for at least one frequency bin of the third set of frequency bins that exceeds the predetermined nominal power spectral density; and
a collective power spectral density for the bandwidth averaged over the sum of the first duration, the second duration, and the third duration is not greater than the predetermined nominal power spectral density over the bandwidth.

6. The method of claim 1, further comprising:
performing, for a third duration subsequent to the second duration, a third wireless transmission of data via the first set of frequency bins, the third wireless transmission having a transmission power for at least one frequency bin of the first set of frequency bins that exceeds the predetermined nominal power spectral density; and
a collective power spectral density for the bandwidth averaged over the sum of the first duration, the second duration, and the third duration is not greater than the predetermined nominal power spectral density over the bandwidth.

7. The method of claim 6, further comprising:
performing, for a fourth duration subsequent to the third duration, a fourth wireless transmission of data via the second set of frequency bins, the fourth wireless transmission having a transmission power for at least one frequency bin of the second set of frequency bins that exceeds the predetermined nominal power spectral density; and
a collective power spectral density for the bandwidth averaged over the sum of the first duration, the second duration, the third duration, and the fourth duration is not greater than the predetermined nominal power spectral density over the bandwidth.

8. The method of claim 1, wherein the first set and the second set each is distributed substantially evenly across the bandwidth.

9. The method of claim 1, wherein performing the first wireless transmission and performing the second wireless transmission comprise performing the first wireless transmission and performing the second wireless transmission in response to determining an unsuitability of wireless transmissions via the first set of frequency bins.

10. The method of claim 9, further comprising determining the unsuitability of wireless transmissions via the first set of frequency bins based on one selected from a group consisting of: a signal-to-noise ratio; a bit error rate; an amount of data transmissible via the channel; and a receipt of a retransmission request.

11. A system comprising:

means for performing, for a first duration, a first wireless transmission of data via a first set of frequency bins from a plurality of frequency bins associated with a bandwidth of a channel, the first wireless transmission having a transmission power for at least one frequency bin of the first set of frequency bins that exceeds a predetermined nominal power spectral density;

means for performing, for a second duration separate from the first duration, a second wireless transmission of data via a second set of frequency bins of the plurality of frequency bins, the second set separate from the first set, the second wireless transmission having a transmission power for at least one frequency bin of the second set of frequency bins that exceeds the predetermined nominal power spectral density, wherein the second set of frequency bins is unused during the first duration and the first set of frequency bins is unused during the second duration; and a collective power spectral density for the bandwidth averaged over the sum of the first duration and the second duration is not greater than the predetermined nominal power spectral density.

* * * * *